United States Patent [19]
Longrod

[11] Patent Number: 6,016,900
[45] Date of Patent: Jan. 25, 2000

[54] FLEXIBLE, DETENTED AXLE

[75] Inventor: Scott Longrod, Lansing, N.Y.

[73] Assignee: Axiohm Transaction Solutions, Inc., Blue Bell, Pa.

[21] Appl. No.: 08/814,134

[22] Filed: Mar. 10, 1997

[51] Int. Cl.$^7$ .......................... B65G 13/00; B65H 19/10
[52] U.S. Cl. .......................... 193/37; 193/35 F; 242/599
[58] Field of Search ...................... 193/37, 35 R, 193/35 TE, 35 F, 35 B; 403/326, 327; 242/599, 599.3, 599.4, 578, 578.3; 211/45; 198/780

[56] References Cited

U.S. PATENT DOCUMENTS

| | | | |
|---|---|---|---|
| 1,882,943 | 10/1932 | Ross | 403/326 |
| 2,471,140 | 5/1949 | Breth | 193/35 R |
| 2,486,607 | 11/1949 | Laystrom et al. | 242/599.3 |
| 2,507,701 | 5/1950 | Feiner et al. . | |
| 2,713,445 | 7/1955 | Speck . | |
| 2,880,503 | 4/1959 | Carissimi . | |
| 2,935,270 | 5/1960 | Martin | 242/599 |
| 2,973,870 | 3/1961 | Schoos . | |
| 3,051,404 | 9/1962 | Ritchey | 242/599 |
| 3,138,340 | 6/1964 | Caravella | 242/599 |
| 4,149,662 | 4/1979 | Ramaciere . | |
| 5,292,083 | 3/1994 | Ridenour | 242/599 |
| 5,421,442 | 6/1995 | Agnoff | 193/37 |
| 5,588,627 | 12/1996 | Sharpe | 242/599 |
| 5,678,676 | 10/1997 | Pierson | 193/37 |

Primary Examiner—Robert P. Olszewski
Assistant Examiner—Isobel A. Parker
Attorney, Agent, or Firm—Salzman & Levy

[57] ABSTRACT

The present invention features a new type of spring-loaded axle. The spring-loaded axle of this invention has a single element. The single component of this invention has a specially-designed spring that acts both as a detent and an axle, all in one. The spring includes an elongated, flexible, coiled, spring portion that has a compressible, coiled midsection that is flanked by a generally non-compressible, coiled section on either side of the compressible, coiled midsection. At the distal end of each of the non-compressible, coiled sections is located a flexible, generally non-compressible, curvilinear, coiled end section. Each of the conically-shaped, coiled end sections acts like a detent; further, because of their conical shape, they can automatically adjust to the bores of the supporting frame. The elongated, coiled spring portion acts like an axle. The compressible, coiled midsection allows the conically-shaped, coiled end sections to axially adjust to the end bores in the support frame by providing an axial spring-biasing to them. The device is inserted into a hollow bore of a roller, thus allowing the roller to rotatively move about the device, as well as the support frame. The conically-shaped, coiled end sections assist in locating and anchoring the roller for rotation about the support frame. The flexibility of the device, as provided by its coiled configuration, allows it to withstand a greater degree of transverse loadings and side forces.

4 Claims, 1 Drawing Sheet ns is yet another object of this invention to provide an improved, detented axle.

FLEXIBLE, DETENTED AXLE

FIELD OF THE INVENTION

The present invention pertains to detented axles and, more particularly, to a flexible, spring-loaded axle that can automatically adjust to transverse loadings.

BACKGROUND OF THE INVENTION

Roller elements that form part of a roller drive system are usually rotatively fixed into the conveyor frame via their locator pins. These locator pins for rotatively attaching the rollers are often spring-loaded, so that they make positive contact in the supporting frame. The spring-loaded, detent system is not unlike the detents used to attach a watchband to the body of a watch casing. Such spring-loaded detents are shown in U.S. Pat. Nos. 4,149,662 and 2,713,445 (issued, respectively, to RAMACIERE on Apr. 17, 1979, and SPECK on Jul. 19, 1955), respectively entitled "Wrist Watch Band" and "End Attachment for Watch Bands".

Another, similar type of detent support is illustrated in the common toilet-paper holder; its spring-loaded axle allows the toilet-paper roll to rotate with respect to the wall housing. This type of detent system is also shown in roller combs used in electric shavers, as illustrated in U.S. Pat. Nos. 2,880,503 and 2,507,701 (issued, respectively, to CARISSIMI on Apr. 7, 1959, and FEINER et al on May 16, 1950), respectively entitled "Shaver with Rolling Combs" and "Spring Bar".

Still another, similar, detent-mounting system is shown in U.S. Pat. No. 2,973,870 (issued to SCHOOS on Mar. 7, 1961), entitled "Spring Mounted Curtain Rod".

A significant difficulty associated with a spring-loaded detent used to support an axle is its inability to flex at the joint where it contacts the bore of the supporting frame. This inflexibility results, under transverse loading, in detent damage. In watchbands, where there is not much transverse load placed on the detent, this type of damage is not much of a concern. Yet, frequently an expensive watch is lost when the axle detent becomes bent, and the band thus detaches from the watch's body.

In conveying systems, using a plurality of spaced-apart rollers for conveying materials in an axial direction, the detented rollers are often subjected to heavy transverse loadings. Although the loads may be transitory in nature, the detents become bent over time. Replacing worn or damaged conveying units disposed on shelving or on upper tiers of warehouse storage racks can be inconvenient and expensive. In fact, this poses a common, major problem for those charged with overseeing storage facility and warehouse operations.

Spring-loaded axles of the common design mentioned above contain several moving parts, consisting of two, interleaved, hollow-axle, rod elements, along with an internal spring. The present invention, however, provides a new type of spring-loaded, detent axle that has no moving parts; can better withstand transverse loadings; and comprises only one part, viz., a spring. When used in a roller conveying system, such a simple, spring-detent-and-axle element has many advantages. First, the simplicity of the device creates a lower fabrication cost than other such devices. Secondly, the spring-detent-and-axle is flexible, therefore being-able to take more punishment, including transverse loads, without breakage or damage. Third, the spring-detent-axle of this invention automatically seats within a supporting bore. Should the supporting bore become out-of-round, misshapen or oversized through wear, the spring-detent-axle of this invention automatically adjusts itself within the hole. With ordinary, spring-loaded detents, a misshapen or oversized bore will not adequately support or receive the detent. Fourth, the spring-detent-axle of this invention is a spring-detent-and-axle combination, an all-in-one element; this allows the element to be easily installed and removed.

It is an object of this invention to provide an improved, detented axle.

It is also an object of this invention to provide a detent-and-axle combination that will better withstand transverse, as well as side, loadings.

It is still another object of this invention to provide a detent-and-axle combination that is self-adjusting.

It is a further object of the invention to provide a detent-and-axle combination that can be fabricated at a low cost.

It is yet another object of this invention to provide a detent-and-axle device that has fewer moving parts.

SUMMARY OF THE INVENTION

In accordance with the present invention, there is provided a new type of spring-loaded axle, which comprises a single element. The single component of this invention comprises a specially-designed spring that acts both as a detent and an axle, all in one. The spring includes an elongated, flexible, coiled, spring portion comprising a compressible, coiled midsection that is flanked by a generally non-compressible, coiled section on either side of the compressible, coiled midsection. At the distal end of each of the non-compressible, coiled sections is disposed a flexible, generally non-compressible, curvilinear, coiled end section. Each of the conically-shaped, coiled end sections acts like a detent; further, because of their conical shape, they can automatically adjust to the bores of the supporting frame. The elongated, coiled spring portion acts like an axle. The compressible, coiled midsection allows the conically-shaped, coiled end sections to axially adjust to the end bores in the support frame by providing an axial spring-biasing thereto. The device is inserted into a hollow bore of a roller, thus allowing the roller to rotatively move about the device, as well as the support frame. The conically-shaped, coiled end sections assist in locating and anchoring the roller for rotation about the support frame. The flexibility of the device, as provided by its coiled configuration, allows it to withstand a greater degree of transverse loadings and side forces.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the FIGURES.

DESCRIPTION OF THE PREFERRED EMBODIMENT

Generally speaking, the invention features a new type of detent-and-axle combination. The detent-and-axle combination of this invention features a single-spring element comprising an elongated coil. The midsection of the elongated coil is compressible, thus providing an axial spring-biasing to the detent ends of the device. The ends of the elongated coil surrounding the midsection are substantially non-compressible; they provide rigidity to the elongated coil structure. The distal-end portions of the non-compressible section of the structure are conically-shaped, so as to provide an automatic seating adjustment to the bores disposed in the supporting frame. The flexibility of the inventive device, as provided by its coiled configuration, allows it to withstand a greater degree of transverse loadings and side forces.

Figure 1:
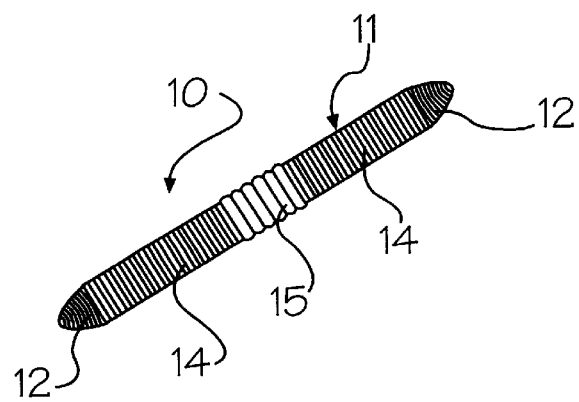
FIG. 1 illustrates a perspective view of the single-element, detent-and-axle combination device of this invention.

Now referring to FIG. 1, the detent-and-axle combination device 10 of this invention is illustrated in a perspective view. The detent-and-axle combination device 10 comprises an elongated, coiled, spring body 11. The detent ends 12 of the elongated, coiled, spring body 11 are curvilinear, or conically-shaped, as shown. The major portion of the elongated, coiled, spring body 11 is composed of two sections of densely-packed coils 14 that are flexible in bending, but are substantially axially non-compressible along the length of the device 10. The midsection 15 of the spring body 11 of the device 10 comprises wider-spaced, loosely-packed coils, which are compressible along the longitudinal axis of the body 11. The device 10 is thus both flexible in bending and axially compressible. The spring body 11 comprises metal coils; flexible plastic, however, may also suffice for the coil structure.

Figure 2:
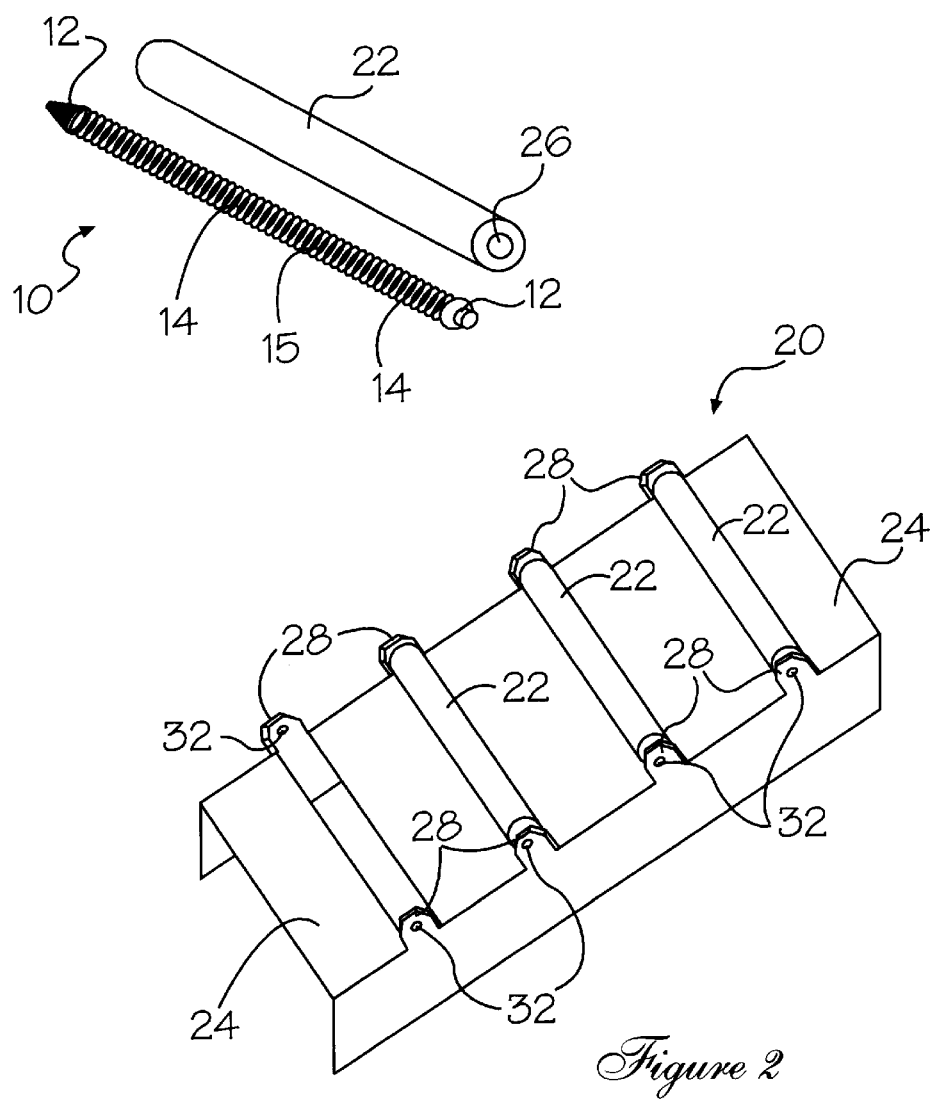
FIG. 2 depicts a partially exploded, in situ view of the detent-and-axle combination device shown in FIG. 1, as it is used in a roller conveying system.

Referring to FIG. 2, a conveyor track 20 is shown in a partially exploded, perspective view. Rollers 22 are spaced apart along the longitudinal axis of the conveyor track frame 24, as illustrated. The rollers 22 are hollow, as evidenced by bore 26. The bore 26 of each roller 22 carries the device 10 inside. The conical, distal end 12 of each of the devices 10 anchors its respective roller 22 for rotation with respect to the frame 24. The frame 24 has vertically disposed, spaced-apart support arms 28, which receive the distal ends 12 in apertures 32. The conically-shaped, coiled ends 12 automatically adjust and position themselves within apertures 32. The compressed midsection 15 of the spring device 10 forces the conical structure of the coiled ends 12 into the apertures 32, and biasly holds the spring device 10 and the roller 22 in place. The rollers 22 are flexibly held to the frame 24, since the internally-held spring device 10 is flexibly bent. In this fashion, the rollers can withstand a certain amount of transverse bending forces, without becoming deformed or damaged.

The body 11 of the device 10 is such that it represents an internal support shaft or axle for the roller 22. In addition, the conically-shaped, coiled ends 12 act like self-adjusting detents via the compressive action of the biasing midsection 15. In this manner, the device 10 is a combination device of both axle-and-detent. The device 10 is a single component, serving two separate purposes, and having essentially no moving parts. Due to its simplicity, the device 10 offers an improved axle-detent apparatus that can be easily fabricated, assembled and removed from the conveyor track 20.

Since other modifications and changes varied to fit particular operating requirements and environments will be apparent to those skilled in the art, the invention is not considered limited to the examples chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. An axle-detent combination apparatus, comprising a single element, said single element having an elongated body and two distal ends, said elongated body comprising a plurality of coils and being substantially non-compressible, except for a compressible midsection portion that provides a biasing, spring force to said distal ends thereof, with said distal ends having a curvilinear shape, so as to adjust to aperture supports and act as detents therein, and act as bearing members, and further wherein said elongated body is designed to fit internally into a hollow of a roller and serve as an axle thereto.

2. An article of manufacture, comprising a coiled spring having a body portion that includes end sections which are substantially non-compressible along a longitudinal axis thereof, said body portion having distal ends that are curvilinear-shaped and a compressible section in a mid-portion thereof, said compressible section disposed between said end sections for the purpose of providing a spring-biasing to said distal ends, whereby said distal ends act as bearing members and serve as detents for said body portion, when disposed within aperture supports.

3. An article of manufacture, comprising a coiled spring having a body portion that is substantially non-compressible about end portions thereof, said body portion having distal ends that are conically-shaped and a compressible section in a mid-portion thereof for the purpose of providing a spring-biasing to said distal ends, whereby said distal ends act as bearing members and serve as detents for said body portion, when disposed within aperture supports.

4. An article of manufacture, comprising a coiled spring, said coiled spring having a body comprising both compressible and substantially non-compressible sections, with said substantially compressible section having flexibility in bending about a longitudinal axis thereof, said body having distal ends that are conically-shaped, with said compressible section disposed in a mid-portion of said body between said non-compressible sections for the purpose of providing a spring-biasing to said distal ends, said non-compressible sections comprising substantially an entire spring length, except for a small number of compressible turns disposed in said compressible section of said mid-portion, whereby said distal ends act as bearing members and serve as detents for said body portion, when disposed within aperture supports.

* * * * *